US008756595B2

(12) United States Patent
Arcilla et al.

(10) Patent No.: US 8,756,595 B2
(45) Date of Patent: Jun. 17, 2014

(54) METHOD AND SYSTEM FOR DISTRIBUTED APPLICATION STACK DEPLOYMENT

(75) Inventors: Andre Arcilla, San Jose, CA (US); Konstantin Boudnik, Castro Valley, CA (US); Roman V. Shaposhnik, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 222 days.

(21) Appl. No.: 13/192,575

(22) Filed: Jul. 28, 2011

(65) Prior Publication Data

US 2013/0031542 A1 Jan. 31, 2013

(51) Int. Cl.
*G06F 9/445* (2006.01)

(52) U.S. Cl.
USPC .......................................... 717/177; 709/201

(58) Field of Classification Search
USPC ......................................................... 717/177
See application file for complete search history.

(56) References Cited

U.S. PATENT DOCUMENTS

| | | | | |
|---|---|---|---|---|
| 6,601,236 B1 * | 7/2003 | Curtis | | 717/177 |
| 7,340,520 B1 * | 3/2008 | Jordan et al. | | 709/226 |
| 7,577,722 B1 * | 8/2009 | Khandekar et al. | | 709/220 |
| 7,665,085 B2 * | 2/2010 | Sundararajan et al. | | 717/174 |
| 7,685,148 B2 * | 3/2010 | Engquist et al. | | 709/201 |
| 7,761,559 B2 * | 7/2010 | Mei et al. | | 709/224 |
| 7,802,243 B1 * | 9/2010 | Feeser et al. | | 717/169 |
| 7,844,963 B2 * | 11/2010 | Pitzel et al. | | 717/171 |
| 7,958,485 B2 * | 6/2011 | Steiner et al. | | 717/103 |
| 8,051,416 B2 * | 11/2011 | Grund et al. | | 717/172 |
| 8,082,289 B2 * | 12/2011 | Tannenbaum et al. | | 709/201 |
| 8,327,347 B1 * | 12/2012 | Feeser et al. | | 717/169 |
| 8,402,083 B2 * | 3/2013 | Tannenbaum et al. | | 709/201 |
| 2003/0014510 A1 * | 1/2003 | Avvari et al. | | 709/223 |
| 2003/0208528 A1 * | 11/2003 | Volkov et al. | | 709/203 |
| 2008/0209016 A1 * | 8/2008 | Karve et al. | | 709/221 |
| 2008/0216006 A1 * | 9/2008 | Jordan et al. | | 715/771 |
| 2009/0037287 A1 * | 2/2009 | Baitalmal et al. | | 705/26 |
| 2013/0031542 A1 * | 1/2013 | Arcilla et al. | | 717/177 |

FOREIGN PATENT DOCUMENTS

EP 2299360 3/2011

OTHER PUBLICATIONS

International Search Report corresponding to International Patent Application No. PCT/US2012/044754 dated Dec. 27, 2012.

* cited by examiner

*Primary Examiner* — Don Wong
*Assistant Examiner* — Theodore Hebert
(74) *Attorney, Agent, or Firm* — Pillsbury Winthrop Shaw Pittman LLP

(57) ABSTRACT

Method, system, and programs for deploying a distributed application stack on a cluster. A request is first received to deploy the distributed application stack including a plurality of software artifacts on the cluster including a plurality of nodes. Configuration information is then retrieved from a configuration repository based on the received request. The configuration information includes a version of each software artifact of the distributed application stack and a type of each node of the cluster. An instruction is created for each node based on the retrieved configuration information. The instruction is to be used to direct each node to deploy at least one of the plurality of software artifacts from a software package repository onto the node itself. The created instruction is then transmitted to each node.

25 Claims, 16 Drawing Sheets

Exemplary Request / User Interface

Project HIT_20_tag_based

This build requires parameters:

| | | |
|---|---|---|
| Description of the cluster | CLUSTER | hit2 ** — 902 |
| Version of the distributed application stack | HIT_DEPLOYMENT_TAG | hit_0_20_203_0_1104271329_r2 ** — 904 |
| Record repository | MAILTO | hadoop-hit@yahoo-inc.com ** — 906 |

Build

Fig. 9

Exemplary Software Configuration
Software artifacts in a
version-controlled
package format

| # | Component | Package Version |
|---|---|---|
| 01 | Hadoop Fred | hadoop-0.20.203.3.1104221543 |
| 02 | Hadoop Fred | hadooppaudi-0.20.203.0.1104271329 |
| 03 | Hadoop Fred | hadoopviewfs-0.20.203.1102110410 |
| 04 | Hadoop Fred | gridjdk-1.6.0_21.1011192346 |
| 05 | Hadoop Fred | gridjdk64-1.6.0_21.1011192346 |
| 06 | Hadoop Fred | HadoopConfiggeneric0nodeblue-0.20.203.0.1104271329 |
| 07 | Hadoop Fred | HadoopConfiggeneric0node12diskblue-0.20.203.0.1104271329 |
| 08 | DAQ | Daq-0.1.1104262128 |
| 09 | Distcp | ygrid_hatoop_distcp-0.1.1101250802 |
| 10 | HCat | hcat_client-0.1.0.03251547 |
| 11 | HCat | hcat_server-0.1.0.03251547 |
| 12 | HDFS Proxy | ygrid_hdfsproxy_ht-3.0.0.1104072227 |
| 13 | Hive | hive_cli-0.0.7_6 |
| 14 | Hive | hive_server-0.0.7_6 |
| 15 | Log Collector | ygrid_hatoop_log_collector-0.1.1010231503 |
| 16 | Nova | nova-1.1.1.2 |
| 17 | Pig | pig-0.8.0..1103400012 |
| 18 | Vaidya | hatoop_vaidya-0.22 |

Fig. 11

METHOD AND SYSTEM FOR DISTRIBUTED APPLICATION STACK DEPLOYMENT

BACKGROUND

1. Technical Field

The present teaching relates to methods, systems, and programming for distributed computing. Particularly, the present teaching is directed to methods, systems, and programming for distributed application stack deployment.

2. Discussion of Technical Background

Distributed computing is a field of computer science that studies distributed systems, which include multiple autonomous computers or parallel virtual machines that communicate through a computer network, such as a computer cluster having multiple nodes. The machines in a distributed system interact with each other in order to achieve a common goal. A computer program that runs in the distributed system is called a distributed application. In distributed computing, a problem is divided into many tasks, each of which is solved by one or more computers, such as the nodes of a computer cluster. Distributed systems and applications may be applied as various paradigms, including grid computing, utility computing, edge computing, and cloud computing by which users may access the server resources using a computer, netbook, tablet, smart phone, or other device through the Internet.

For instance, APACHE HADOOP is a software framework that supports data-intensive distributed applications under a free license. It enables applications to work with thousands of nodes and petabytes of data. Rather than rely on hardware to deliver high-availability, HADOOP is designed to detect and handle failures at the application layer, thereby delivering a highly-available service. HADOOP is deployed on a computer cluster in the form of a HADOOP stack, which includes a set of software artifacts (HADOOP components), such as HADOOP software, configuration files, libraries, links, source code, documentations, miscellaneous, etc. The deployment of HADOOP on a cluster of machines usually involves hardware installation, operating system installation, update, and configuration, JAVA installation and configuration, and HADOOP stack installation, configuration, and diagnostic.

One of the most challenging tasks in HADOOP or any other distributed application deployment is ensuring all the artifacts in the application stack are deployed in correct versions on each machine based on the specific role/type of the machine in the cluster. However, known solutions of HADOOP deployment usually involve manual interventions, which are inefficient and ineffective. For example, a user has to fetch artifact versions from developer's email or from deployment decision meeting notes, enter versions into a XML or text file, run a command to download specified artifact versions onto each machine, and download additional required artifacts, especially those that are not properly versioned or not packaged. In addition, known solutions cannot keep tracking all the deployment records, such as the role/type of each machine in the cluster and the specific version of each artifact in the HADOOP stack that has been installed on a particular machine. Therefore, there is a need to provide a solution for automated assembly, deployment, and startup of the specific package versions of distributed application stacks, such as the HADOOP stack, to a set of machines identified in configuration storage, such that the resulting deployment is fully configured and recorded, and the deployed distributed application is ready for use.

SUMMARY

The present teaching relates to methods, systems, and programming for distributed computing. Particularly, the present teaching is directed to methods, systems, and programming for distributed application stack deployment.

In one example, a method, implemented on at least one machine having at least one processor, storage, and a communication platform connected to a network for automatically deploying a distributed application stack on a cluster. Via a user interface, a request is first received to deploy the distributed application stack including a plurality of software artifacts on the cluster including a plurality of nodes. A configuration retrieval unit retrieves configuration information from a configuration repository based on the received request. The configuration information includes a version of each software artifact of the distributed application stack and a type of each node of the cluster. An instruction generator creates an instruction for each node based on the retrieved configuration information. The instruction is to be used to direct each node to deploy at least one of the plurality of software artifacts from a software package repository onto the node itself. The instruction generator then transmits the created instruction to each node.

In another example, a method, implemented on at least one machine having at least one processor, storage, and a communication platform connected to a network for automatically deploying a distributed application stack including a plurality of software artifacts on a cluster including a plurality of nodes. A node deployment unit, via a communication platform, receives an instruction to be used to direct one of the plurality of nodes to deploy at least one of the plurality of software artifacts from a software package repository onto the node based on a version of each software artifact and a type of the node. The node deployment unit then identifies at least one target software artifact from the plurality of software artifacts for the node based on the received instruction. The node deployment unit then determines a version of the at least one target software artifact for the node based on the received instruction. A fetching unit fetches the at least one target software artifact in the determined version from the software package repository to the node. An installation unit installs the at least one target software artifact in the determined version on the node. A record generator, via the communication platform, transmits a record for the node indicating a status during the deployment and/or a result after the deployment.

In a different example, a system for automatically deploying a distributed application stack on a cluster is presented, which includes a user interface, a configuration retrieval unit, and an instruction generator. The user interface is configured to receive a request to deploy the distributed application stack including a plurality of software artifacts on the cluster including a plurality of nodes. The configuration retrieval unit is operatively coupled to the user interface and is configured to retrieve configuration information from a configuration repository based on the received request. The configuration information includes a version of each software artifact of the distributed application stack and a type of each node of the cluster. The instruction generator is operatively coupled to the configuration retrieval unit and is configured to create an instruction for each node based on the retrieved configuration information. The instruction is to be used to direct each node to deploy at least one of the plurality of software artifacts from a software package repository onto the node itself. The instruction generator is also configured to transmit the created instruction to each node.

In another different example, a system for automatically deploying a distributed application stack including a plurality of software artifacts on a cluster including a plurality of nodes is presented, which includes a node deployment unit, a fetching unit, an installation unit, and a record generator. The node deployment unit is configured to receive, via a communication platform, an instruction to be used to direct one of the plurality of nodes to deploy at least one of the plurality of software artifacts from a software package repository onto the node based on a version of each software artifact and a type of the node. The node deployment unit is also configured to identify at least one target software artifact from the plurality of software artifacts for the node based on the received instruction and to determine a version of the at least one target software artifact for the node based on the received instruction. The fetching unit is operatively coupled to the node deployment unit and is configured to fetch the at least one target software artifact in the determined version from the software package repository to the node. The installation unit is operatively coupled to the fetching unit and is configured to install the at least one target software artifact in the determined version on the node. The record generator is operatively coupled to the installation unit and is configured to transmit, via the communication platform, a record for the node indicating a status during the deployment and/or a result after the deployment.

Other concepts relate to software for automatically deploying a distributed application stack on a cluster. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for automatically deploying a distributed application stack on a cluster recorded thereon, wherein the information, when read by the machine, causes the machine to perform a series of steps. A request is first received to deploy the distributed application stack including a plurality of software artifacts on the cluster including a plurality of nodes. Configuration information is then retrieved from a configuration repository based on the received request. The configuration information includes a version of each software artifact of the distributed application stack and a type of each node of the cluster. An instruction is created for each node based on the retrieved configuration information. The instruction is to be used to direct each node to deploy at least one of the plurality of software artifacts from a software package repository onto the node itself. The created instruction is transmitted to each node.

In another example, a machine readable and non-transitory medium having information recorded thereon for automatically deploying a distributed application stack on a cluster including a plurality of nodes recorded thereon, wherein the information, when read by the machine, causes the machine to perform a series of steps. An instruction is first received to be used to direct one of the plurality of nodes to deploy at least one of the plurality of software artifacts from a software package repository onto the node based on a version of each software artifact and a type of the node. At least one target software artifact is then identified from the plurality of software artifacts for the node based on the received instruction. A version of the at least one target software artifact for the node is determined based on the received instruction. The at least one target software artifact is fetched in the determined version from the software package repository to the node. The at least one target software artifact is then installed in the determined version on the node. A record for the node indicating a status during the deployment and/or a result after the deployment is transmitted.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 9 shows an exemplary request/user interface, according to an embodiment of the present teaching;

FIG. 11 shows an exemplary software configuration, according to an embodiment of the present teaching.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of distributed application stack deployment in a fully automated manner. The deployment method and system as disclosed herein aim at eliminating manual interventions in distributed application stack deployment in order to make the deployment more efficient and effective. Such method and system benefit users in several ways: for example, the deployment of the distributed application stack is fully automated; the deployed versions of all the artifacts in the distributed application stack are fully identified and recorded; the distributed application stack deployment is reproducible; and the distributed application stack deployment is done in a simple manner, such as via a single-click submission (for a default cluster/distributed application stack version) or via a single deployment form.

Figure 1A:
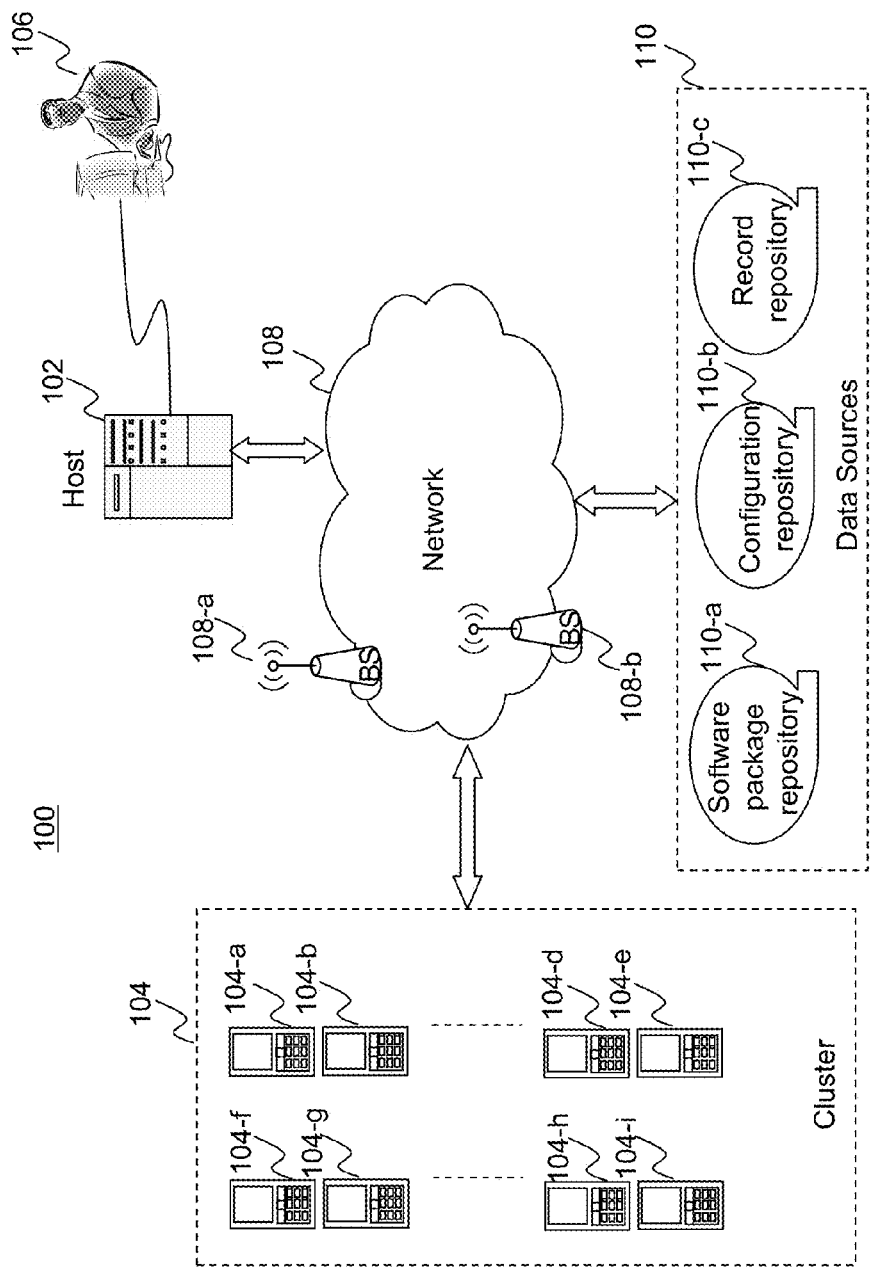
FIGS. 1(a)-1(c) depict exemplary embodiments of a networked environment in which distributed application stack deployment is applied, according to an embodiment of the present teaching.
Figure 1B:
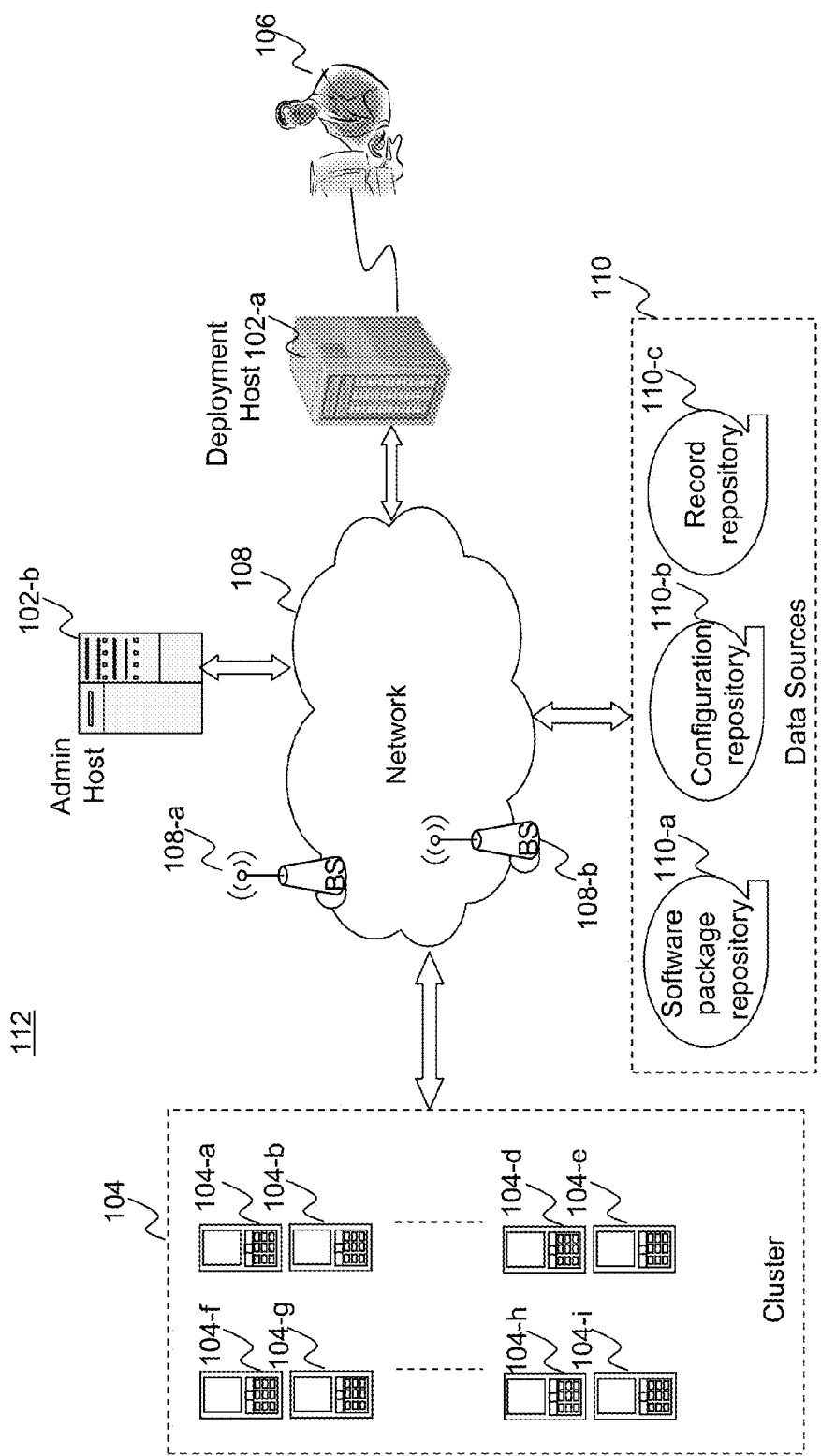
Figure 1C:
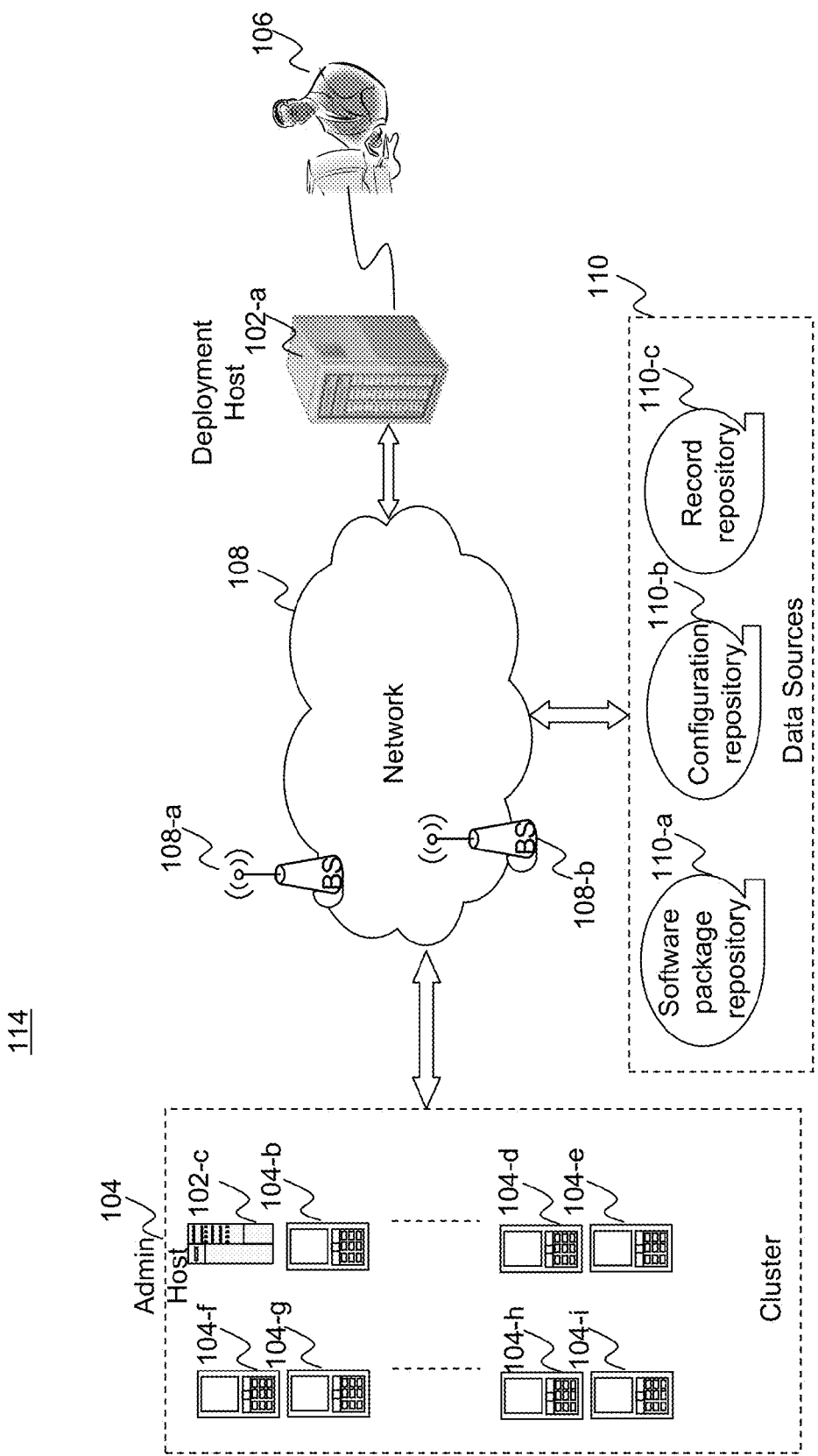

FIGS. 1(a)-1(c) depict high level exemplary system configurations in which a distributed application stack can be automatically deployed on a cluster 104, according to an embodiment of the present teaching. In FIG. 1(a), the exemplary system 100 includes a host 102, a cluster 104, a user 106, a network 108, and data sources 110, including a software package repository 110-a, a configuration repository 110-b, and a record repository 110-c. The network 108 may be a single network or a combination of different networks. For example, the network 108 may be a local area network (LAN), a wide area network (WAN), a public network, a private network, a proprietary network, a Public Telephone Switched Network (PSTN), the Internet, a wireless network, a virtual network, or any combination thereof. The network 108 may also include various network access points, e.g., wired or wireless access points such as base stations or Internet exchange points 108-a, . . . , 108-b, through which a data source may connect to the network in order to transmit information via the network.

The cluster 104 in which the distributed application stack to be deployed may include a plurality of nodes 104-a, 104-b, . . . 104-h, 104-i, which communicate through the network 108 or through an internal network (not shown). In this example, each node of the cluster 104 may be an autonomous physical machine, such as a server, a workstation, a desktop or laptop computer, a tablet, a smart phone, or any other suitable machine. In another example, some or all of the nodes may be parallel virtual machines implemented by either software emulation or hardware virtualization. The clusters 104 may be a set of machines owned by one entity, e.g., enterprise, and maintained as a server farm or server cluster where the servers are mounted on racks in a server room or data center. The cluster 104 may also be a collection of machines owned by different entries and that are physically separate from each other at a distance.

The data sources 110 include one or more databases on one or more servers for providing and storing information related to the distributed application stack deployment. For example, the software package repository 110-a is a storage location from which software packages may be retrieved and installed on the machines of the cluster 104. The configuration repository 110-b may keep the configuration information necessary for the distributed application stack deployment including, for example, the version of each software artifact of the distrusted application stack and the type of each node of the cluster 104. The record repository 110-c may include a database storing all the records related to the distributed application stack deployment, including, for example, the status of each node during the deployment (e.g., the version of each software artifact to be installed on a particular node) and the result of the deployment for each node (e.g., whether each software artifact has been properly installed on a particular node and whether a diagnostic procedure has been performed and passed). It is understood that the data sources 110 may be maintained by the same entity that owns the cluster 104 or by a third-party, and may be implemented either on a single server having one or more databases or on multiple connected or unconnected servers.

In this exemplary system 100, a user 106, who may be a network administrator, operator, developer, or customer of the cluster 104, may send a request to the host 102 via an internal or proprietary network connection to automatically deploy the distributed application stack on the cluster 104. The host 102, in response to the request, may retrieve configuration information from the configuration repository 110-b of the data sources 110 and create an instruction for each node of the cluster 104 based on the retrieved configuration information. Each node of the cluster 104, in accordance with the instruction received from the host 102, may fetch the appropriate software artifacts from the software package repository 110-a of the data sources 110 and install them onto the node. In addition, the status and result of the deployment may be fully and automatically recorded and stored in the record repository 110-c of the data sources 110 during and/or after the deployment by the host 102 in conjunction with the cluster 104.

FIG. 1(b) presents a similarly system configuration as what is shown in FIG. 1(a) except that the host 102 is now configured as two separate machines: a deployment host 102-a and an admin host 102-b. In this exemplary system 114, only the admin host 102-b has the super-user or administrator access privileges to all the machines of the cluster 104. The deployment host 102-a in this example may be any computing device serving as an interface for the user 106 to input the request of deployment. For example, the user 106 may be a customer who subscribes to the usage of the cluster 104 and intends to deploy a distributed application stack on the cluster 104 through his computer, i.e., the deployment host 102-b, from home.

FIG. 1(c) presents another similarly system configuration as what is shown in FIG. 1(b) except that the admin host 102-c is also one of the nodes of the cluster 104. That is, one machine in the cluster 104 acts as both the admin host and a node of the cluster 104. It is noted that different configurations as illustrated in FIGS. 1(a)-1(c) can also be mixed in any manner that is appropriate for a particular application scenario. For example, in one application scenario, the functions of a deployment host, an admin host, and a cluster node may be implemented on a single machine.

Figure 2A:
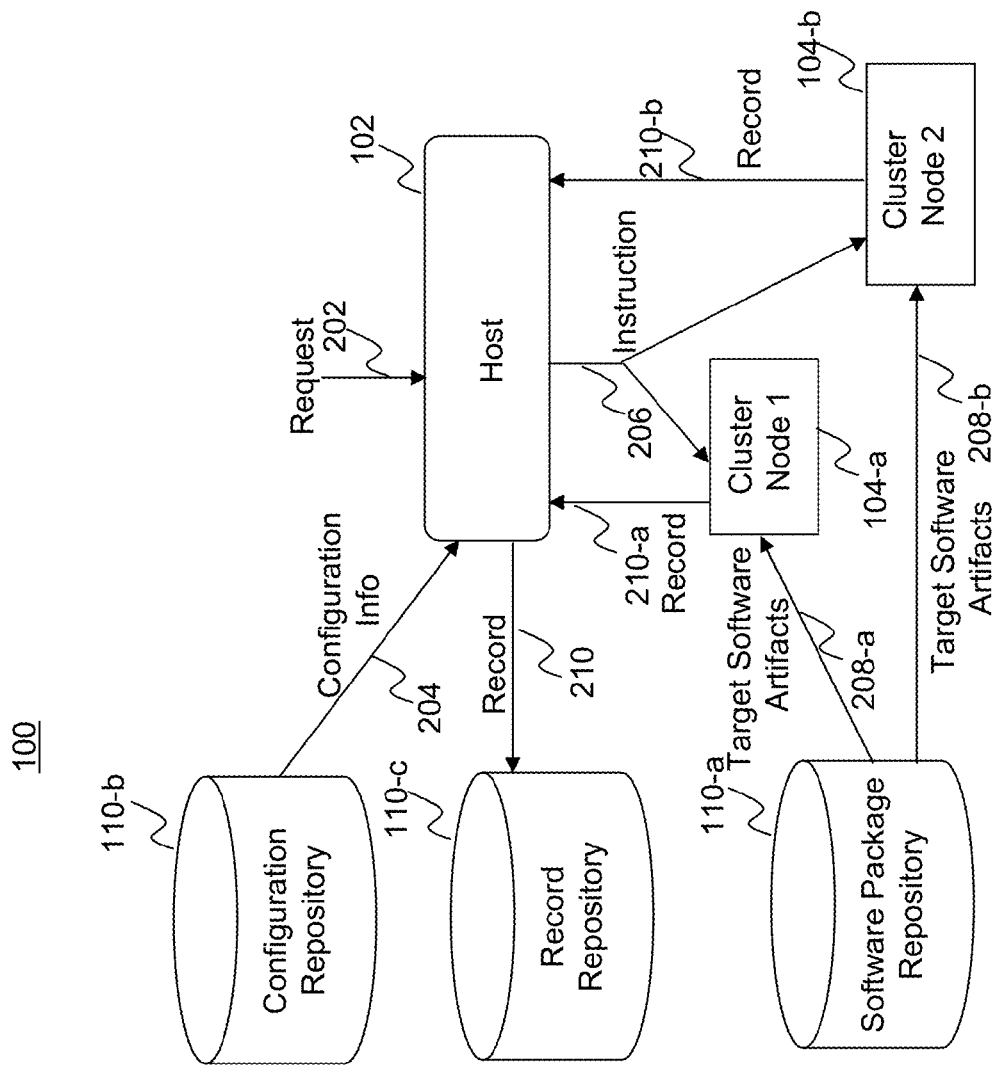
FIGS. 2(a)-2(c) are high level exemplary system diagrams of a system for automatically deploying a distributed application stack on a cluster, according to an embodiment of the present teaching.

FIG. 2(a) shows a more detailed high level exemplary system diagram of the system 100 shown in FIG. 1(a), according to a first application embodiment of the present teaching. In this exemplary embodiment, the system 100 includes a host 102, a plurality of cluster nodes 104-a, 104-b, a software package repository 110-a, a configuration repository 110-b, and a record repository 110-c. The host 102 may receive a request 202 from a user in the form of, for example, a deployment form or a single-click submission. The request 202 may include a version of the distributed application stack and a description of the cluster 104. In response to receiving the request 202, the host 102 may be responsible for retrieving configuration information 204 from the configuration repository 110-b based on the version of the distributed application stack and the description of the cluster 104 in the request 202. For example, the configuration information 204 may include a software configuration having the version of each software artifact of the distributed application stack and a cluster configuration having the type of each node of the cluster 104. The configuration information 204 may be stored and retrieved in various forms, such as but not limited to a XML file or a text file. Based on the retrieved configuration information 204, the host 102 may create an instruction 206 for the cluster nodes 104-a, 104-b. The instruction 206 may be used to direct each cluster node 104-a, 104-b to deploy at least one software artifact in the distributed application stack from the software package repository 110-a onto each node 104-a, 104-b itself. In this example, the instruction 206 is created to work on all node types. The instruction 206 may include executable code such as a script that can be executed by the cluster nodes 104-a, 104-b and other information necessary for deployment. For example, such information may include association information between one or more target software artifacts and each type of the cluster nodes 104-a, 104-b and version information of the one or more target software artifacts for each type of the cluster nodes 104-a, 104-b. The instruction 206 may be transmitted to each cluster node 104-a, 104-b.

In this example, each cluster node 104-a, 104-b receives the same generic instruction 206 from the host 102. That is, it is unnecessary for the host 102 to create a customized instruction for each individual cluster node 104-a, 104-b. Based on the received instruction 206, each cluster node 104-a, 104-b may be responsible for identifying at least one target software artifacts 208-a, 208-b from all the software artifacts of the distributed application stack for the respective cluster node 104-a, 104-b. For example, for HADOOP deployment, the instruction 206 may include cluster configuration indicating that the cluster node 1 104-a is a Name node in the cluster 104 and also include association information indicating a set of target software artifacts associated with a Name node. Accordingly, by executing the script in the instruction 206, the cluster node 1 104-a may identify its target software artifacts 208-a. Similarly, the cluster node 2 104-b may identify another set of target software artifacts 208-b, which may be different from the set of target software artifacts 208-a for the cluster node 1 104-a if the types of the two cluster nodes 104-a, 104-b are different. There may be more than one version of each target software artifact stored in the software package repository 110-a and thus, the version of each target software artifact 208-a, 208-b to be deployed may also be determined by each cluster node 104-a, 104-b based on the received instruction 206, for example, the version information as noted above. As shown in FIG. 2(a), the target software artifacts 208-a, 208-b in the determined versions may be fetched from the software package repository 110-a and installed onto each cluster node 104-a, 104-b, respectively. As noted above, in this example, all the operations on each cluster node 104-a, 104-b may be automatically performed by executing the script in the received instruction 206 with reference to the information in the instruction 206.

In this example, each cluster node 104-a, 104-b may be also responsible for transmitting a record 210-a, 210-b to the host 102, which indicates the status and result of the target software artifacts fetching and installation. The host 102 then may collect the records 210-a, 210-b from all the nodes of the cluster 104 and store the record 210 into the record repository 110-c. The record 210 may be stored in the form of, for example, a log file or a TWiki page.

Figure 2B:
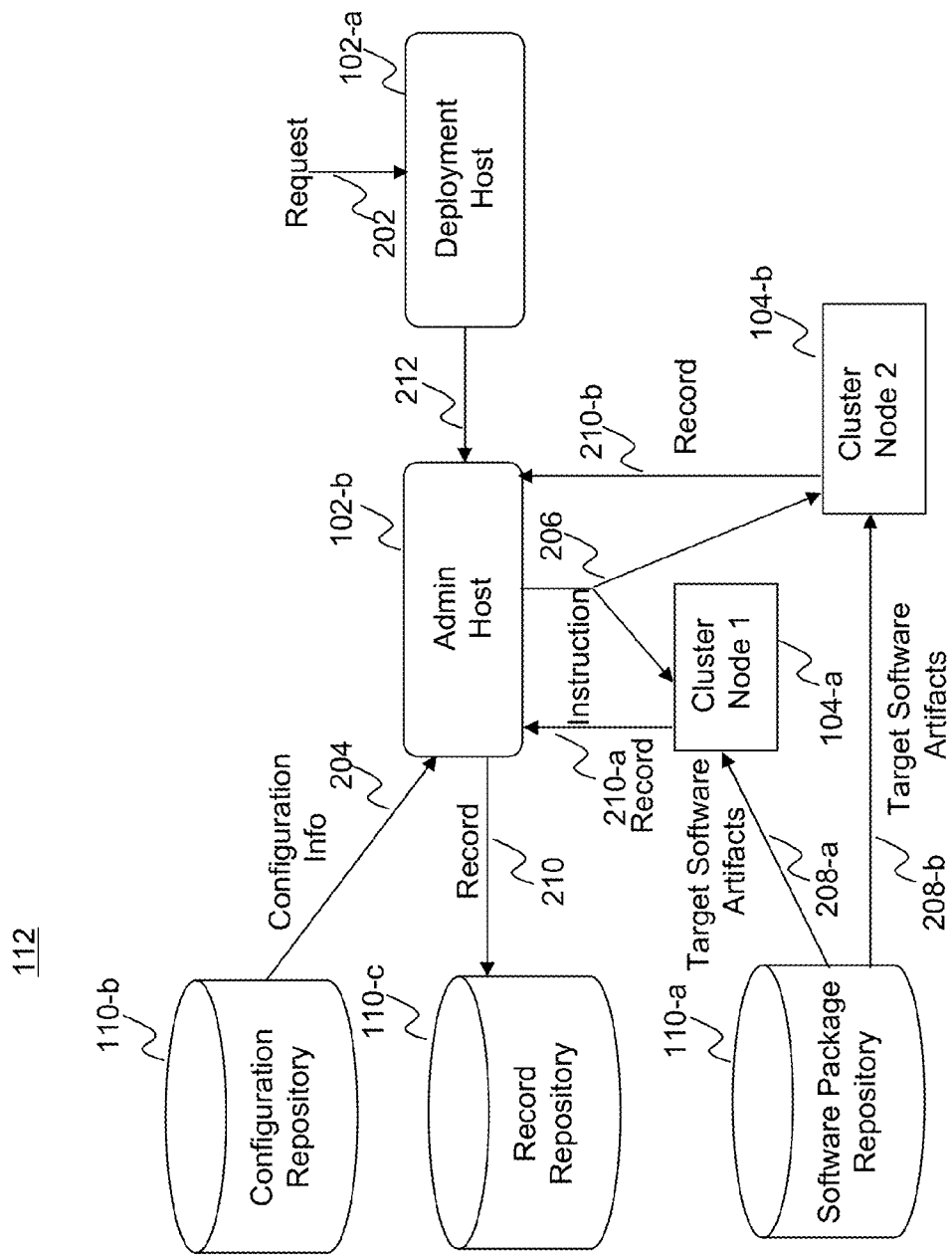

FIG. 2(b) shows a more detailed high level exemplary system diagram of the system 112 shown in FIG. 1(b), according to a second application embodiment of the present teaching. FIG. 2(b) presents a similarly system configuration as what is shown in FIG. 2(a) except that the host 102 is now configured as two separate machines: a deployment host 102-a and an admin host 102-b. In this example, the deployment host 102-a may be responsible for receiving the deployment request 202 from a user. Since the deployment host 102-a may not have the access privilege to the cluster 104 and/or the data sources 110, in this example, the deployment host 102-a may generate an instruction 212, including executable code such as one or more scripts and information of the received request 202. The first script may log into the admin host 102-b and cause the admin host 102-b to execute the second script with reference to the information of the received request 202. The admin host 102-b then may perform all other functions of the host 102, as described in FIG. 2(a).

Figure 2C:
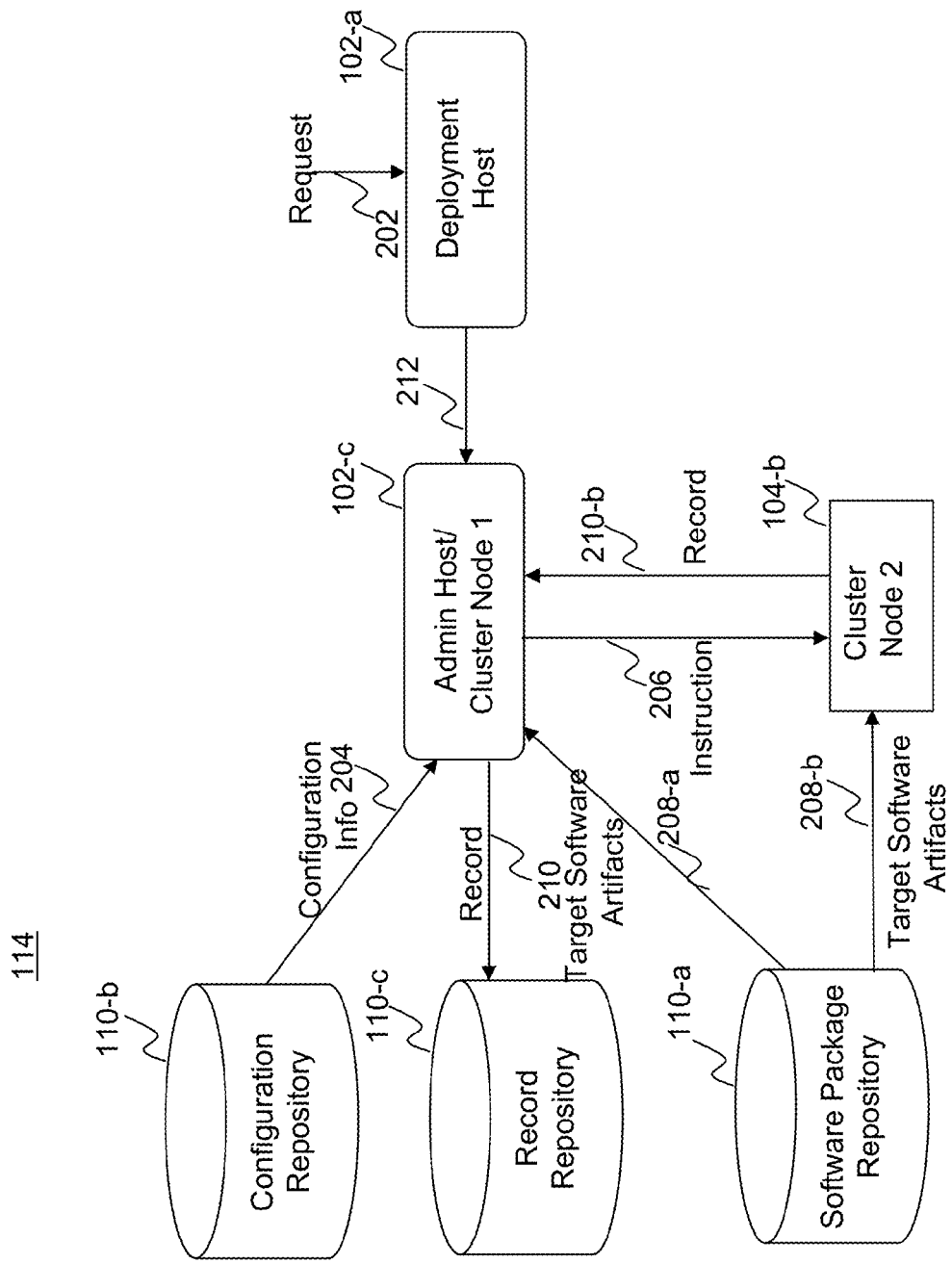

FIG. 2(c) shows a more detailed high level exemplary system diagram of the system 114 shown in FIG. 1(c), according to a third application embodiment of the present teaching. FIG. 2(c) presents a similarly system configuration as what is shown in FIG. 2(b) except that the admin host 102-c is also one of the nodes of the cluster 104. In this example, since the admin host 102-c is also a cluster node, a set of target software artifacts 208-a may also need to be deployed on the admin host 102-c based on its type in the cluster 104, as defined in the configuration information 204. Different from the cluster node 2 104-b, the instruction 206 and the record 210-a of the cluster node 1 (i.e., the admin host 102-c in this example) do not need to be transmitted through the network connecting the cluster nodes. Other than that, the admin host 102-c may perform all the functions of the cluster node 1 104-a, as described in FIGS. 2(a) and 2(b).

Figure 3:
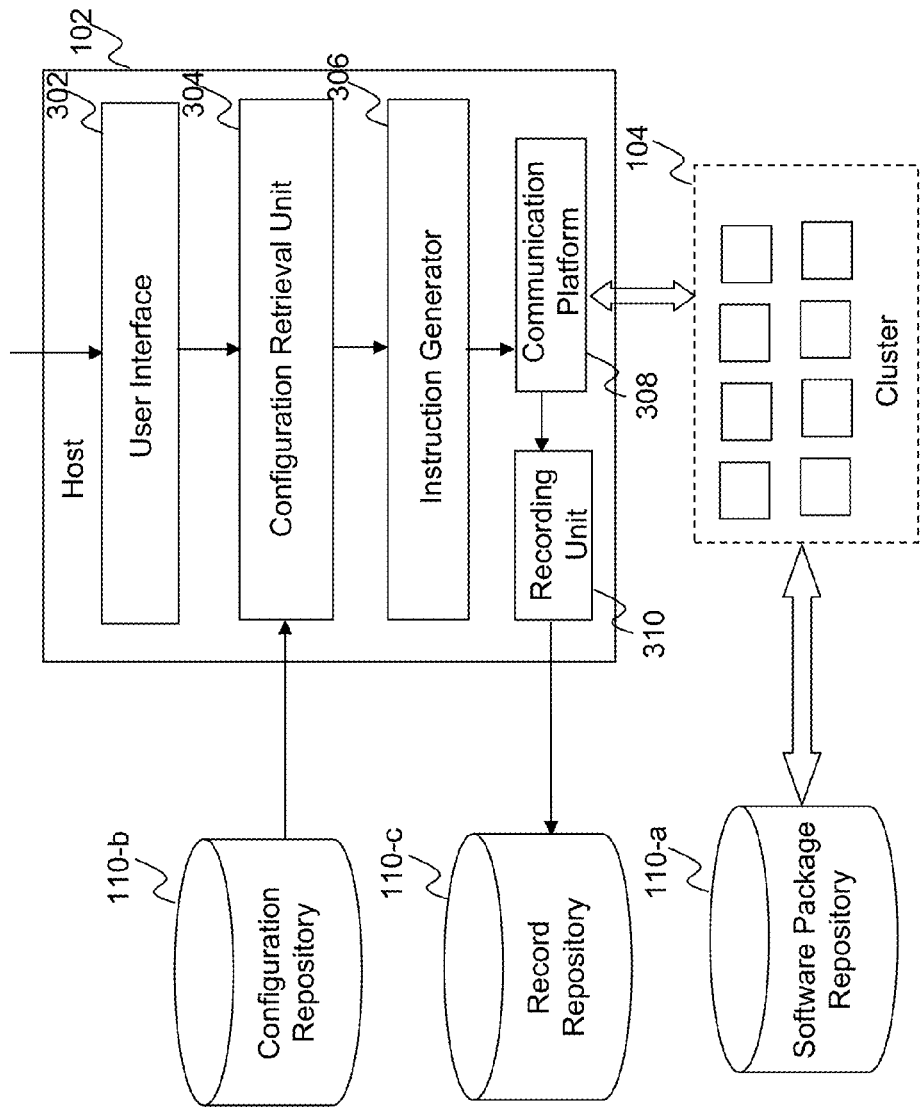
FIG. 3 is a depiction of an exemplary host of the system for automatically deploying a distributed application stack on a cluster shown in FIGS. 2(a)-2(c), according to an embodiment of the present teaching.

FIG. 3 depicts an exemplary system diagram of the host 102, according to an embodiment of the present teaching. In this exemplary embodiment, the host 102 acts as both a deployment host and an admin host. In this example, the host 102 includes a user interface 302, a configuration retrieval unit 304, an instruction generator 306, a communication platform 308, and a recording unit 310. The user interface 302 is configured to receive a request to deploy the distributed application stack from a user. Referring now to FIG. 9 in which an exemplary request and user interface 302 is illustrated, in this example, the user interface 302 is in the form of a deployment form, including a Cluster field 902, a Deployment Tag field 904, and a Mailto field 906. The Cluster field 902 may receive the description of the cluster in the form of, for example, an alias, e.g., "hit2" as shown in FIG. 9. The Deployment Tag field 904 may receive the version of the distributed application stack, such as "hit_0_20_203_0_1104271329_t2" as shown in FIG. 9. The Mailto field 906 may receive the location of the record repository 110-c, for example, "hadoop-hit@yahoo-inc.com" in this example. It is understood that the Mailto field 906 may not be necessary in other examples and that the location of the record repository 110-c may be identified in other forms, such as but not limited to alias, ID, URL, etc. Referring back to FIG. 3, the user interface 302 may be in any other suitable form, such as an interactive user interface, a single-click submission (for a default cluster/distributed application stack version), command lines, etc.

In this example, the configuration retrieval unit 304 is operatively coupled to the user interface 302 and the configuration repository 110-b. The configuration retrieval unit 304 is configured to, by executing executable code such as a script generated by the user interface 302 based on the received request, retrieve configuration information from the configuration repository 110-b. As noted above, the configuration information may include the version of each software artifact of the distributed application stack and the type of each node of the cluster.

Figure 10:
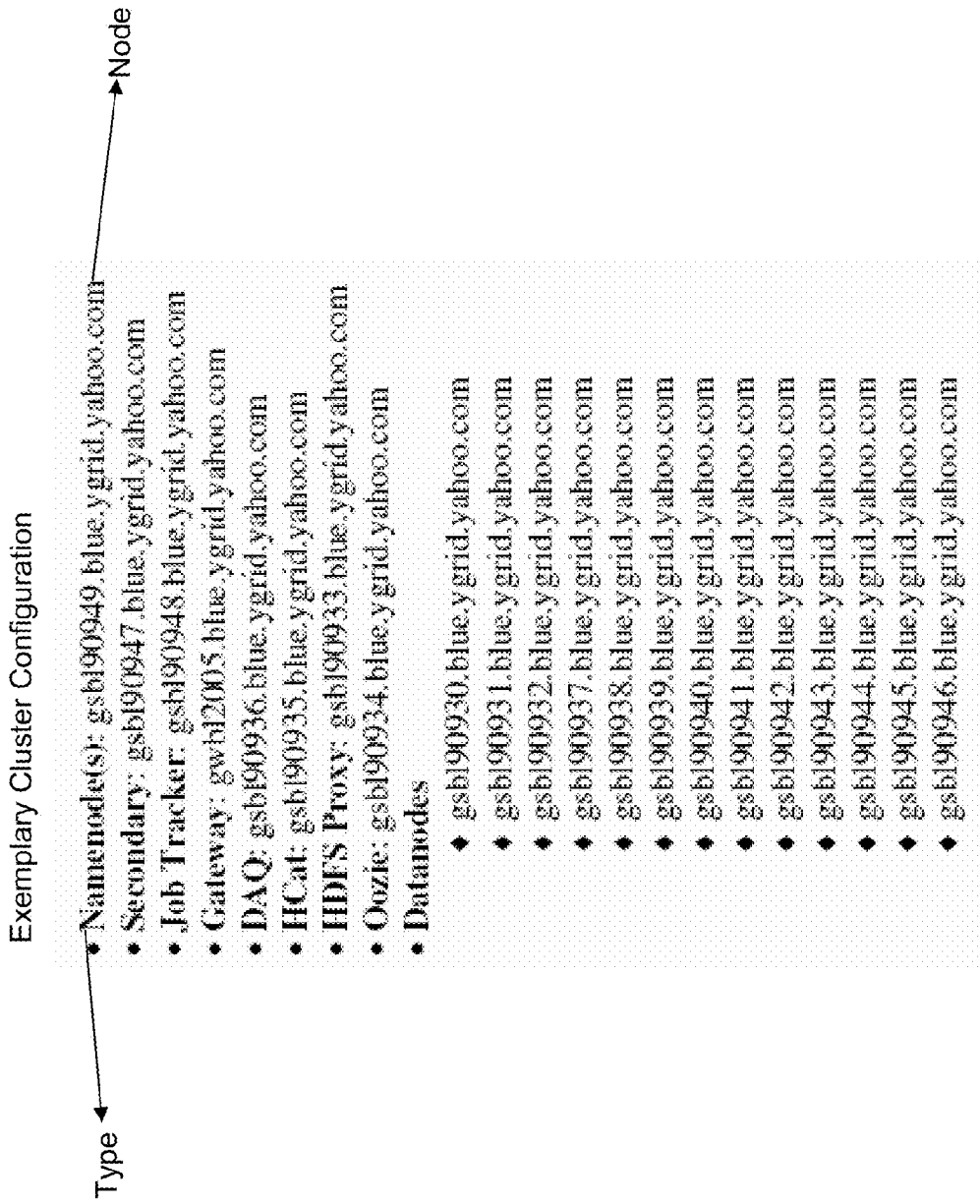
FIG. 10 shows an exemplary cluster configuration, according to an embodiment of the present teaching.

In this example, the type of each node may be obtained based on the received description of the cluster 104 from the user interface 302. Referring now to FIG. 10 in which an exemplary cluster configuration having the type of each node in a HADOOP cluster is illustrated, the type of each node in the cluster 104 may be retrieved based on the received description of the cluster 104 in the Cluster field 902 ("hit2"). The cluster configuration may contain a full list of nodes participating in the cluster 104 and a list of "special" nodes (the ones other than a list of regular working nodes) with the description of a special role each node participates in, e.g., Oozie node, Gateway node, etc. For example, the node "gsb190949.blue.ygrid.yahoo.com" is defined as the Name node, and the node "gsb190947.blue.ygrid.yahoo.com" is defined as the Secondary node. It is understood that although each node in FIG. 10 is identified in the form of a domain name, any other suitable form, for example IP address and alias, may be applied in other examples. As noted above, the exemplary cluster configuration is associated with a specific description of cluster ("hit2") and stored in the configuration repository 110-b. All the cluster configurations may have already been predefined by a user or a third-party in advance to the deployment. Depending on the specific descriptions of clusters, various cluster configurations may be retrieved by the configuration retrieval unit 304.

In this example, the version of each software artifact may also be obtained based on the received version of the distributed application stack from the user interface 302. Referring now to FIG. 11 in which an exemplary software configuration having the version of each software artifact in a HADOOP stack is illustrated, the version of each software artifact in the HADOOP stack may be determined based on the received version of the HADOOP stack in the Deployment Tag field 904 ("hit_0_20_203_0_1104271329_t2"). For example, the version of HDFS Proxy in the specified version of HADOOP stack is 3.0.0.0.1104072227, and the version of DAQ is 0.1.1104262128. Since some components of the HADOOP stack may include more than one software artifact, the version of each software artifact in those components may be separately defined. For example, Hive component may include a client artifact and a server artifact having the same version of 0.0.7_6. In this example, all the software artifacts are in the version-controlled package formats, such as but not limited to TAR, GZ, CAB, ZIP, RAR, etc. As noted above, the exemplary software configuration is associated with a specific version of the HADOOP stack ("hit_0_20_203_0_1104271329_t2") and stored in the configuration repository 110-b. All the software configurations may be automatically updated or manually input by a user or a third-party in advance to the deployment. Depending on the specific versions of distributed application stacks, various software configurations may be retrieved by the configuration retrieval unit 304. In another example, instead of using the Deployment Tag field 904 to receive the version of the distributed application stack, some or all of the versions of the software artifacts in the distributed application stack to be deployed may be specified directly through the user interface 302. In this situation, it may not be necessary to retrieve the full software configuration or may not be necessary to retrieve the software configuration at all from the configuration repository 110-b.

The version of the distributed application stack is orthogonal to the description of the cluster 104. That is, the description of the cluster 104 determines which conceptual role (type) each node plays (e.g. regular working node, Name node server, gateway, etc.), and the version of the distributed application stack (i.e. a set of software artifacts versions) specifies which specific versions of software artifacts will be deployed on each particular node, so that the node can carry out its role.

Referring back to FIG. 3, in this example, the instruction generator 306 is operatively coupled to the configuration retrieval unit 304 and is configured to create a deployment instruction for the nodes of the cluster 104 based on the retrieved configuration information. For example, the instruction generator 306, by executing executable code such as a script, may read the cluster configuration and software configuration in the retrieved configuration information to generate association information between at least one target software artifact and each type of the nodes. That is, each type of cluster nodes is mapped to a set of target software artifacts that are necessary for the particular type of cluster nodes to act properly. For example, as noted above in FIG. 2(a), a set of target software artifacts 208-a may be associated with a Name node, while another set of target software artifacts 208-b may be associated with a Secondary node. Although it is usually not necessary to further map each individual cluster node to a set of target software artifacts at the host side, in some examples, such mapping may be performed by the instruction generator 306 of the host 102.

The instruction generator 306 may also generate version information of the at least one target software artifact for each type of nodes. That is, the version of each target software artifact for each type of nodes may be identified based on the software configuration. Optionally, in generating such version information, the instruction generator 306 may further check the latest version of each target software artifact from the software package repository 110-a or from any other suitable source to determine if the current version specified in the retrieved software configuration should be updated. For example, the instruction generator 306 may determine that the version of Nova (1.1.1.2) retrieved from the configuration repository 110-b in FIG. 11 may be not up to date and that a latest version 1.1.2.1 of Nova may be available in the software package repository 110-a. In this situation, the instruction generator 306 may further determine whether the latest version of Nova should replace the retrieved version in the version information by considering various factors, such as but not limited to compatibility, reliability, completeness, audit, certification, and compliance. The instruction generator 306 may optionally request the confirmation from the user or the cluster administrator to update one or more software artifacts to the latest versions in the version information in the instruction and/or the software configuration in the configuration information.

The instruction generator 306 is further configured to provide the instruction by including the association information and the version information into the instruction. The cluster configuration, as part of the configuration information retrieved by the configuration retrieval unit 304, may be incorporated into the association information or separately included into the instruction by the instruction generator 306. Optionally, as noted above, the instruction generator 306 may also provide executable code, such as a script, as part of the instruction. The instruction in this example may be created by the instruction generator 306 in the form of a compressed or non-compressed software package. In this example, the instruction generator 306 is also configured to cause the communication platform 308 to transmit the instruction to each node of the cluster 104.

In this example, the recording unit 310 is operatively coupled to the communication platform 308 and the record repository 110-c. The recording unit 310 is configured to receive, through the communication platform 308, the record from each node of the cluster 104 indicating the status during the deployment and/or the result after the deployment for the respective node. In this example, the recording unit 310 is also configured to consolidate all the received records and store them in the record repository 110-c. It is understood that although the record repository 110-c in FIG. 3 is remote from the host 102, in other examples, the record repository 110-c may be part of the host 102.

Figure 4:
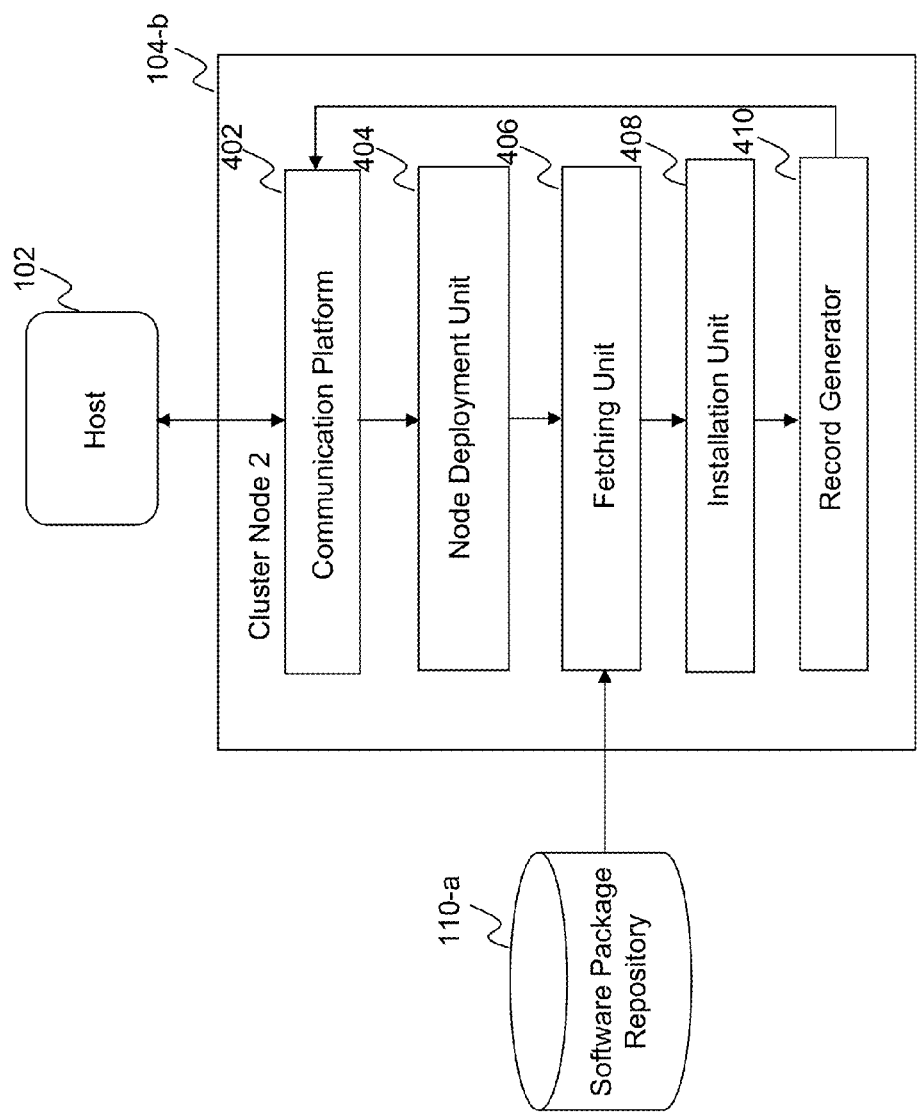
FIG. 4 is a depiction of an exemplary cluster node of the system for automatically deploying a distributed application stack on a cluster shown in FIGS. 2(a)-2(c), according to an embodiment of the present teaching.

FIG. 4 depicts an exemplary system diagram of the cluster node 104-b, according to an embodiment of the present teaching. In this exemplary embodiment, the cluster node 104-b includes a communication platform 402, a node deployment unit 404, a fetching unit 406, an installation unit 408, and a record generator 410. The communication platform 402 receives the deployment instruction from the host 102 and forwards the instruction to the node deployment unit 404. If the instruction is received in the form of a software package, the instruction may be first unpackaged into the local file system of the cluster node 104-b. In this example, the node deployment unit 404 is configured to identify at least one target software artifact from the plurality of software artifacts for the specific cluster node 104-b based on the instruction, for example, the association information as noted above. For example, the association information in the instruction may associate the Secondary node type of cluster nodes to a particular set of software artifacts in the distributed application stack. The script in the instruction may be executed by the node deployment unit 404 to identify that the cluster node 104-b is a Secondary type cluster node according to the cluster configuration, which may be part of the association information. The node deployment unit 404 may further identify the set of target software artifacts to be installed on the cluster node 104-b according to the mapping in the association information. In this example, the node deployment unit 404 is also configured to determine the version of each identified target software artifact based on the instruction, for example, the version information.

In this example, the fetching unit 406 is operatively coupled to the software package repository 110-a and the node deployment unit 404. The fetching unit 406 is configured to fetch the identified at least one target software artifact in the determined version from the software package repository 110-a. The fetching may be performed by the fetching unit 406 under any suitable protocols known in the art, such as but not limited to FTP, SCP, SSH, P2P, etc. In this example, each software artifact is stored in a version-controlled package format in the software package repository 110-a. A version-controlled package format may be, for example, a compressed TAR file or any other suitable file containing all files for a given software artifact. The package may also contain several manifest files describing component versions and other component-related information. An integral feature of this package system is a server-based repository of all the packages. Once a package is created, it is uploaded to the software package repository 110-a. From this point on, the package may be permanently kept in the software package repository 110-a and associated with a version that was given to it at its creation time. This guarantees that the association between the software package and the version is permanent and immutable. Accordingly, each software artifact may be stored in the software package repository 110-a under various versions, and the fetching unit 406 may fetch the version that is determined by the node deployment unit 404 based on the instruction from the host 102.

In this example, the installation unit 408 is operatively coupled to the fetching unit 406 and configured to install the fetched target software artifacts onto the machine. If the target software artifacts are in the version-controlled package format, the installation unit 408 may unpack all the files into the local file system of the cluster node 104-b before installation. The installation unit 408 may further perform any suitable operation specific to the particular type of node to complete the installation. The record generator 410 is operatively coupled to the installation unit 408 and is configured to cause the communication platform 402 to transmit the deployment record to the host 102. For example, the record generator 410 may record all the information related to the deployment, such as the name, version, installation time, and size of each software artifact installed on the machine and whether the installation of each software artifact was successful. The record may be generated in the form of, for example, a log file or a TWiki page. The record generator 410 may optionally run a node-type specific test to verify whether the installation has been successful and record the test result as well.

Figure 5:
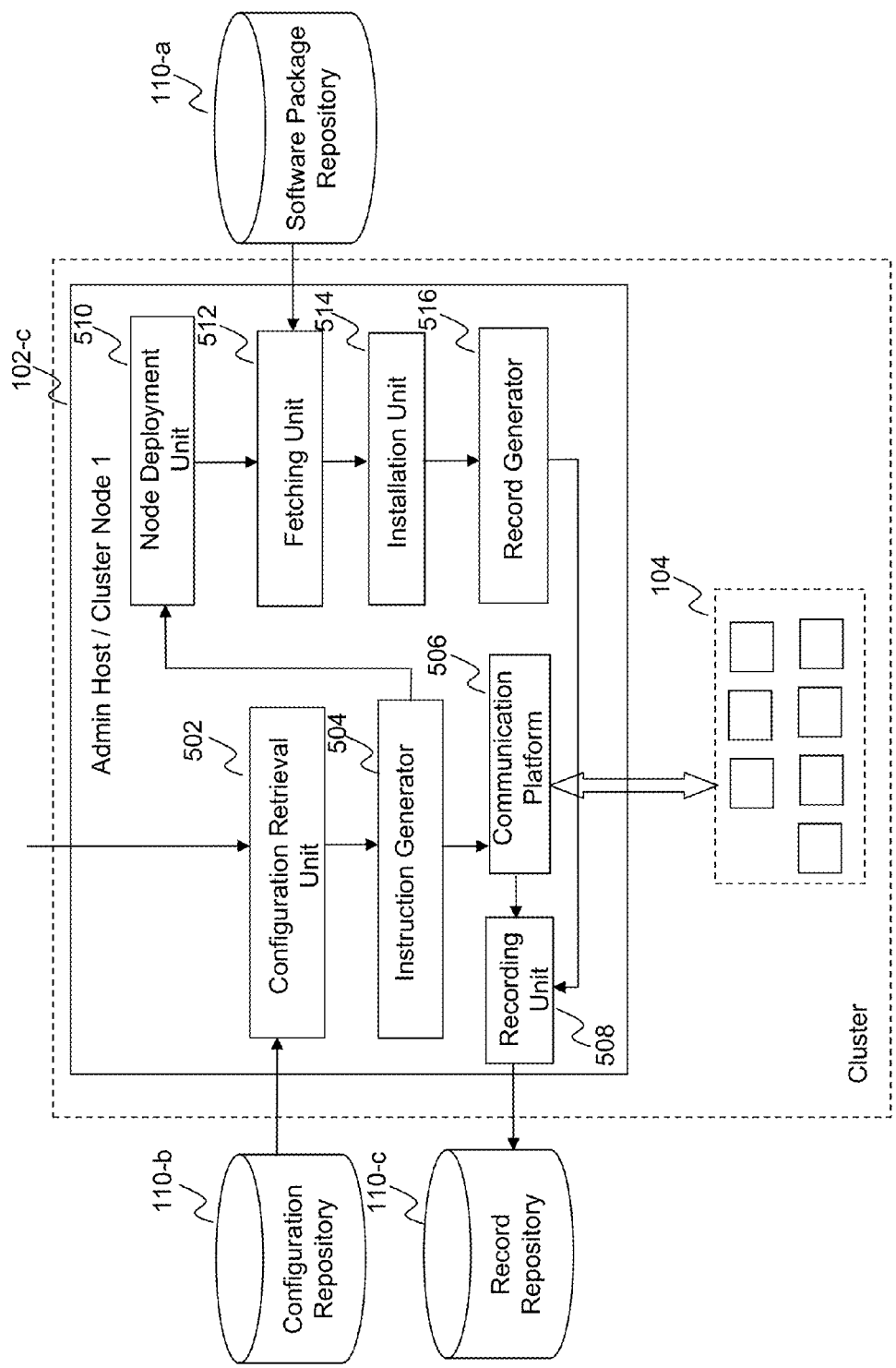
FIG. 5 is a depiction of an exemplary host/cluster node of the system for automatically deploying a distributed application stack on a cluster shown in FIGS. 2(a)-2(c), according to an embodiment of the present teaching.

FIG. 5 depicts an exemplary system diagram of the admin host/cluster node 102-c, according to an embodiment of the present teaching. In this exemplary embodiment, the admin host/cluster node 104-c includes a configuration retrieval unit 502, an instruction generator 504, a communication platform 506, a recording unit 508, a node deployment unit 510, a fetching unit 512, an installation unit 514, and a record generator 516. Most of the units in this example perform the similar functions of their corresponding units in FIGS. 3 and 4. The instruction generator 504 in this example, in addition to causing the communication platform 506 to transmit the instruction to the rest of the cluster 104, may directly forward the instruction to the node deployment unit 510 in the same machine. The record generator 516 in this example may not cause the communication platform 506 to transmit the record but instead, directly forward the record to the recording unit 508. It is noted that since the admin host/cluster node 104-c in this example performs the functions as an admin host but not a deployment host, the admin host/cluster node 104-c may not include a user interface but instead, receive an instruction from a deployment host (not shown in FIG. 5), including all the information in the deployment request and one or more scripts, as noted above in FIG. 2(c). It is understood that in another exemplary embodiment, a machine may act as a combination of a deployment host, an admin host, and a cluster node. In that example, such machine may include a user interface and all the units of the admin host/cluster node 104-c in FIG. 5.

Figure 6:
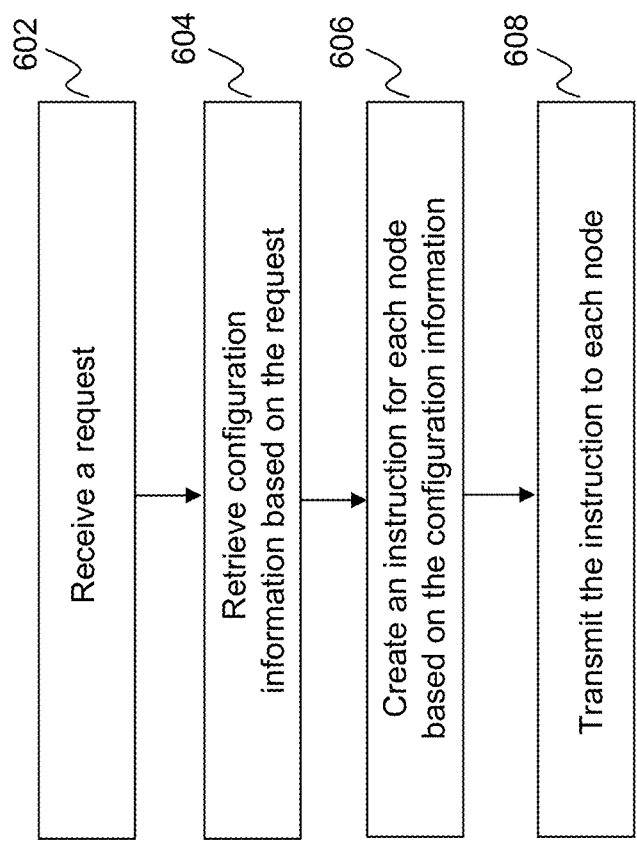
FIG. 6 is a flowchart of an exemplary process of a system for automatically deploying a distributed application stack on a cluster, according to an embodiment of the present teaching.

FIG. 6 is a flowchart of an exemplary process in which a distributed application stack is automatically deployed, according to an embodiment of the present teaching. Beginning at block 602, a request to deploy the distributed application stack, such as a HADOOP stack, on a cluster is received. As described above, this may be performed by the user interface 302 of the host 102. At block 604, processing may continue where configuration information is retrieved from a configuration repository based on the received request. The configuration information may include the version of each software artifact of the distributed application stack and the type of each node of the cluster. As described above, this may be performed by the configuration retrieval unit 304, 502 of the host 102, 102-c. At block 606, an instruction for each node is created based on the retrieved configuration information. The instruction may be used to direct each node to deploy at least one of the plurality of software artifacts from a software repository on the node itself. As described above, this may be performed by the instruction generator 306, 504 of the host 102, 102-c. Proceeding to block 608, the created instruction may be transmitted. As described above, this may be performed by the instruction generator 306, 504 in conjunction with the communication platform 308, 506 of the host 102, 102-c.

Figure 7:
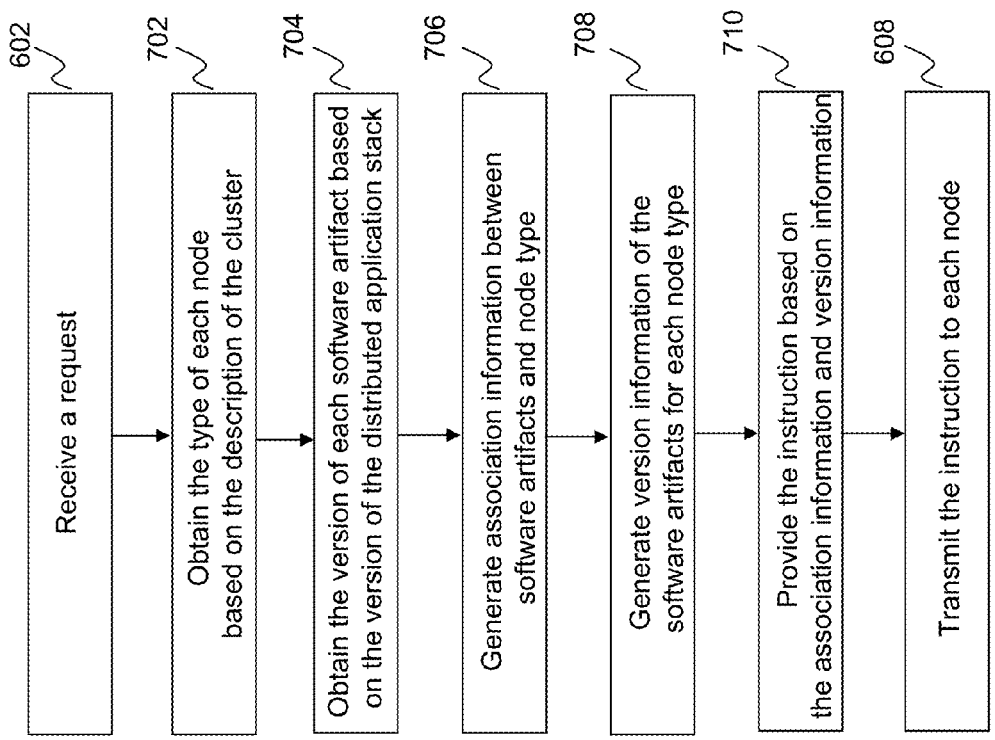
FIG. 7 is a flowchart of another exemplary process of a system for automatically deploying a distributed application stack on a cluster, according to an embodiment of the present teaching.

FIG. 7 is a more detailed flowchart of an exemplary process in which the distributed application stack is automatically deployed, according to an embodiment of the present teaching. Beginning at block 602, a request to deploy the distributed application stack, such as a HADOOP stack, on a cluster is received. The request may include a version of the distributed application stack and a description of the cluster. As described above, this may be performed by the user interface 302 of the host 102. At block 702, processing may continue where the type of each node is obtained from a configuration repository based on the received description of the cluster. At block 704, the version of each software artifact is also obtained from the configuration repository based on the received version of the distributed application stack. As described above, blocks 702 and 704 may be performed by the configuration retrieval unit 304, 502 of the host 102, 102-c. Proceeding to block 706, association information between at least one of the plurality of software artifacts and each type of the nodes is generated. At block 708, version information of the at least one of the plurality of software artifacts is also generated for each type of the nodes. At block 710, the instruction is provided based on the generated association information and the version information. As described above, blocks 706, 708, 710 may be performed by the instruction generator 306, 504 of the host 102, 102-c. Proceeding to block 608, the created instruction may be transmitted. As described above, this may be performed by the instruction generator 306, 504 in conjunction with the communication platform 308, 506 of the host 102, 102-c.

Although the processing illustrated in FIG. 7 is illustrated in a particular order, those having ordinary skill in the art will appreciate that the processing can be performed in different orders. In one example, block 702 can be performed after block 704 or performed essentially simultaneously. In another example, block 706 can be performed after block 708 or performed essentially simultaneously.

Figure 8:
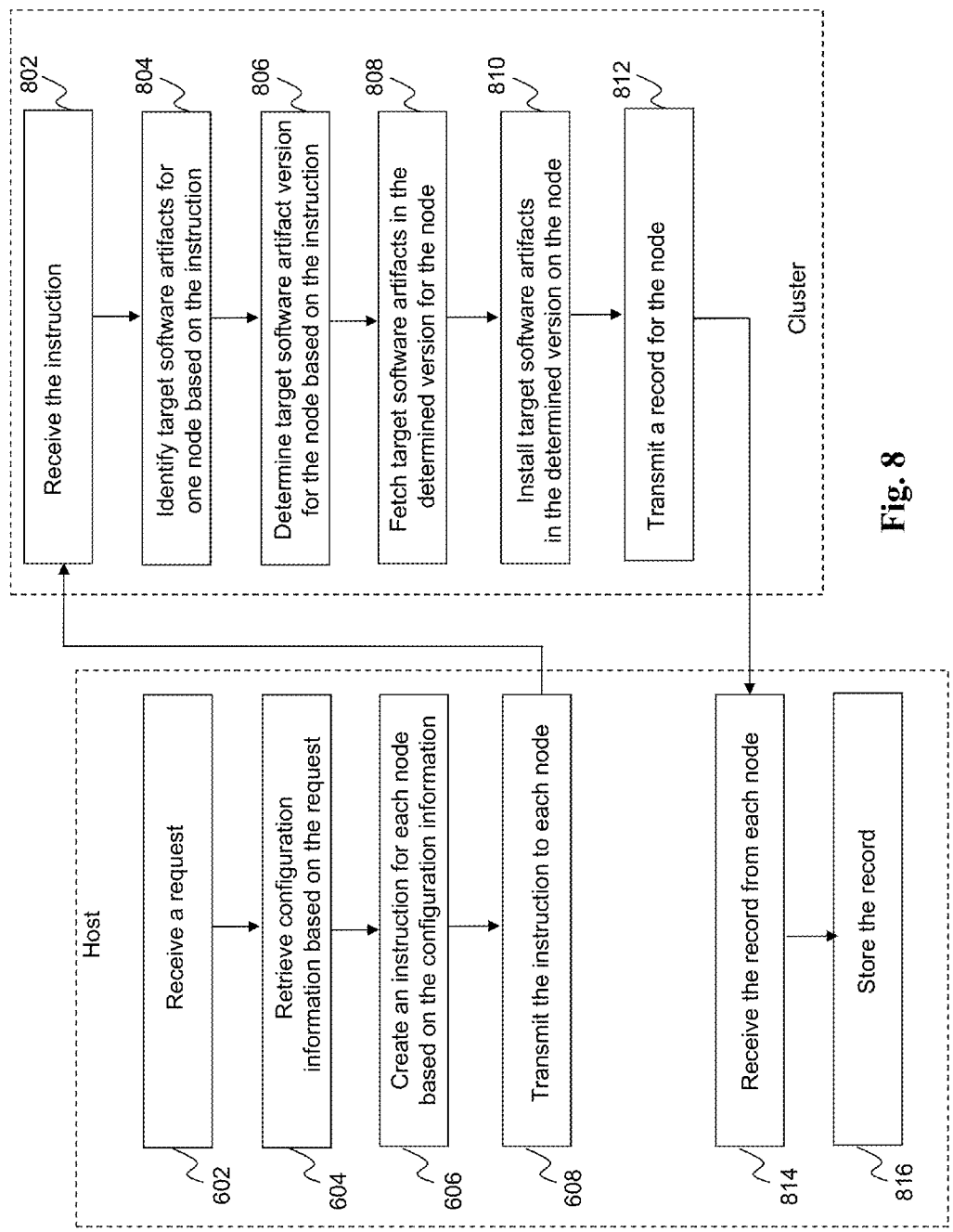
FIG. 8 is a flowchart of still another exemplary process of a system for automatically deploying a distributed application stack on a cluster, according to an embodiment of the present teaching.

FIG. 8 is a flowchart of another exemplary process in which a distributed application stack is automatically deployed, according to an embodiment of the present teaching. Blocks 602, 604, 606, 608 may be performed by the host 102, as described above with reference to FIG. 6. Proceeding to block 802, the instruction is received by each node of the cluster. As described above, this may be performed by the communication platform 402 in conjunction with the node deployment unit 404 of the cluster node 104-b or by the node deployment unit 510 of the admin host/cluster node 102-c alone. Regardless, processing continues to block 804 where at least one target software artifact is identified from the plurality of software artifacts for each node based on the received instruction. At block 806, the version of the at least one target software artifact for each node is also determined based on the received instruction. As described above, blocks 804, 806 may be performed by the node deployment unit 404, 510 of the cluster node 104-b, 102-c. Proceeding to block 808, the at least one target software artifact is fetched in the determined version from a software package repository to each node. As described above, this may be performed by the fetching unit 406, 512 of the cluster node 104-b, 102-c. At block 810, the at least one target software artifact is installed in the determined version onto each node. As described above, this may be performed by the installation unit 408, 514 of the cluster node 104-b, 102-c. At block 812, a record for each node is transmitted to, for example, the host 102. The record may indicate the status during the deployment and/or the result after the deployment for each node. As described above, this may be performed by the record generator 516 of the admin host/cluster node 102-c alone or by the record generator 410 in conjunction with the communication platform 402 of the cluster node 104-b.

Processing now goes back to the host 102 from block 814. At block 814, the record is received from each node. As described above, this may be performed by the recording unit 508 of the admin host/cluster node 102-c alone or by the recording unit 310 in conjunction with the communication platform 308 of the host 102. At block 816, all the received records are stored in a record repository. As described above, this may be performed by the recording unit 310, 508 of the host 102, 102-c.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the DCP processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
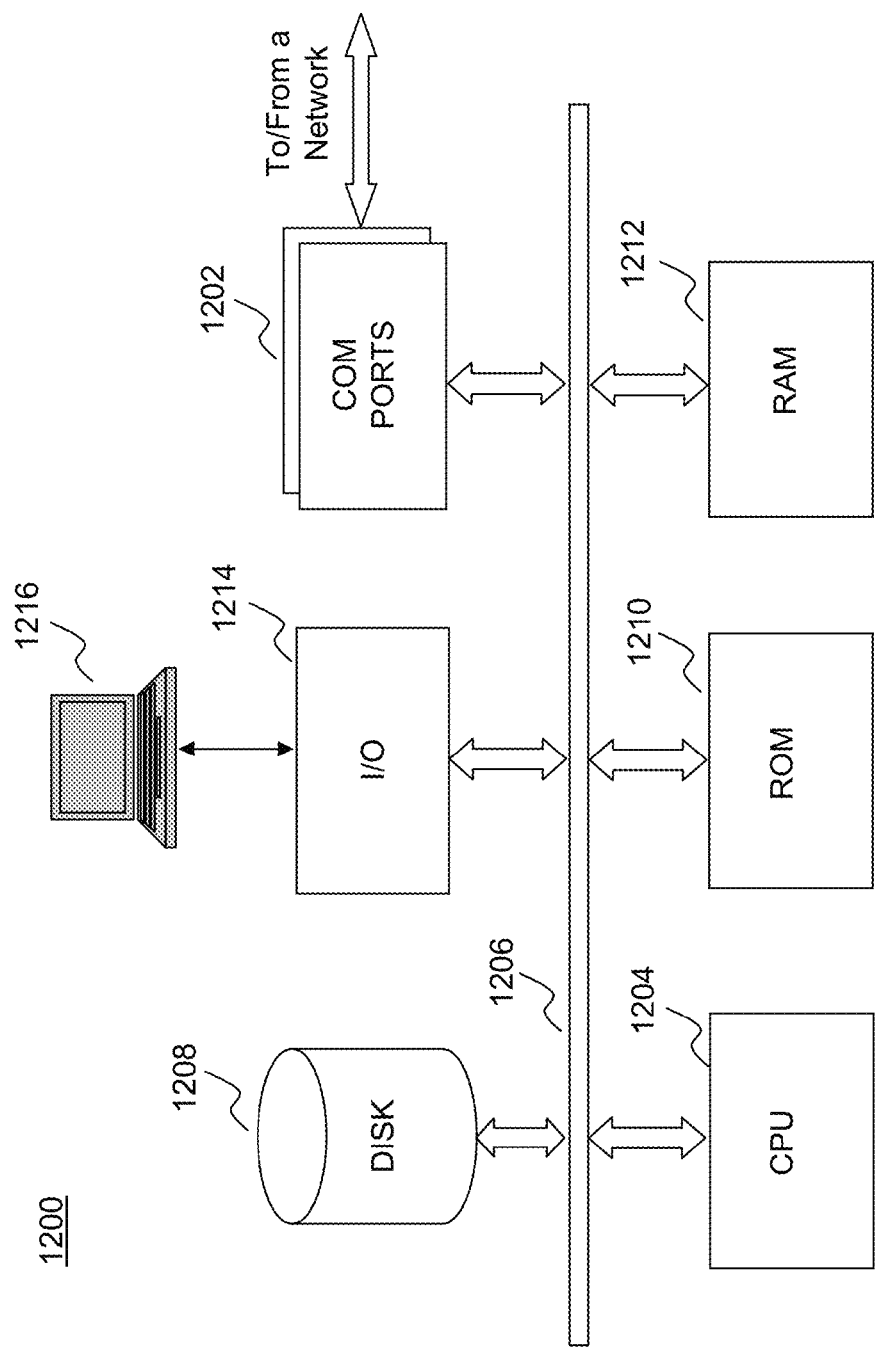
FIG. 12 depicts a general computer architecture on which the present teaching can be implemented.

FIG. 12 depicts a general computer architecture on which the present teaching can be implemented and has a functional block diagram illustration of a computer hardware platform that includes user interface elements. The computer may be a general-purpose computer or a special purpose computer. This computer 1200 can be used to implement any components of the distributed application stack deployment architecture as described herein. Different components of the system 100, 112, 114, e.g., as depicted in FIGS. 1(a), 1(b), 1(c), 2(a), 2(b), and 2(c), can all be implemented on one or more computers such as computer 1200, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1200, for example, includes COM ports 1202 connected to and from a network connected thereto to facilitate data communications. The computer 1200 also includes a central processing unit (CPU) 1204, in the form of one or more processors, for executing program instructions. The exemplary computer platform includes an internal communication bus 1206, program storage and data storage of different forms, e.g., disk 1208, read only memory (ROM) 1210, or random access memory (RAM) 1212, for various data files to be processed and/or communicated by the computer, as well as possibly program instructions to be executed by the CPU. The computer 1200 also includes an I/O component 1214, supporting input/output flows between the computer and other components therein such as user interface elements 1216. The computer 1200 may also receive programming and data via network communications.

Hence, aspects of the method of automatically deploying a distributed application stack on a cluster, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

We claim:

1. A method, implemented on at least one machine having at least one processor, storage, and a communication platform connected to a network for automatically deploying a distributed application stack on a cluster, the method comprising the steps of:

receiving, via a user interface, a request to deploy the distributed application stack including a plurality of software artifacts on the cluster including a plurality of nodes;

retrieving, by a configuration retrieval unit, configuration information from a configuration repository based on the received request, wherein the configuration information includes a version of each software artifact of the distributed application stack and a type of each node of the cluster, where the version is indicative of a state of development of a respective software artifact;

creating, by an instruction generator, an instruction for each node based on the retrieved configuration information, wherein the instruction is to be used to direct each node to deploy at least one of the plurality of software artifacts from a software package repository onto the node itself; and transmitting, by the instruction generator, the created instruction to each node.

2. The method of claim 1, wherein the request comprises a version of the distributed application stack and a description of the cluster.

3. The method of claim 2, wherein the step of retrieving comprises:

obtaining the type of each node from the configuration repository based on the received description of the cluster; and obtaining the version of each software artifact from the configuration repository based on the received version of the distributed application stack.

4. The method of claim 1, wherein the step of creating comprises:

generating association information between at least one of the plurality of software artifacts and each type of the nodes;

generating version information of the at least one of the plurality of software artifacts for each type of the nodes; and providing the instruction based on the generated association information and version information.

5. The method of claim 1, further comprising the steps of:

receiving, by a recording unit, a record from each node indicating a status during the deployment or a result after the deployment for the respective node; and storing, by the recording unit, the received record in a record repository.

6. The method of claim 5, further comprising the steps of:

identifying, by a node deployment unit, at least one target software artifact from the plurality of software artifacts for one of the plurality of nodes based on the transmitted instruction;

determining, by the node deployment unit, a version of the at least one target software artifact for the node based on the transmitted instruction;

fetching, by a fetching unit, the at least one target software artifact in the determined version from the software package repository to the node;

installing, by an installation unit, the at least one target software artifact in the determined version on the node; and transmitting, by a record generator, the record for the node to the recording unit.

7. The method of claim 1, wherein each software artifact is stored in a version-controlled package format in the software package repository.

8. A system having at least one processor, storage, and a communication platform connected to a network for automatically deploying a distributed application stack on a cluster, comprising:

a user interface implemented on the at least one processor and configured to receive a request to deploy the distributed application stack including a plurality of software artifacts on the cluster including a plurality of nodes;

a configuration retrieval unit implemented on the at least one processor and configured to retrieve configuration information from a configuration repository based on the received request, wherein the configuration information includes a version of each software artifact of the distributed application stack and a type of each node of the cluster, where the version is indicative of a state of development of a respective software artifact; and an instruction generator implemented on the at least one processor and configured to:

create an instruction for each node based on the retrieved configuration information, wherein the instruction is to be used to direct each node to deploy at least one of the plurality of software artifacts from a software package repository onto the node itself; and transmit the created instruction to each node.

9. The system of claim 8, wherein the request comprises a version of the distributed application stack and a description of the cluster.

10. The system of claim 9, wherein the configuration retrieval unit, in retrieving the configuration information, is further configured to:

obtain the type of each node from the configuration repository based on the received description of the cluster; and obtain the version of each software artifact from the configuration repository based on the received version of the distributed application stack.

11. The system of claim 8, wherein the instruction generator, in creating the instruction, is further configured to:

generate association information between at least one of the plurality of software artifacts and each type of the nodes;

generate version information of the at least one of the plurality of software artifacts for each type of the nodes; and provide the instruction based on the generated association information and version information.

12. The system of claim 8, further comprising a recording unit configured to:

receive a record from each node indicating a status during the deployment or a result after the deployment for the respective node; and store the received record in a record repository.

13. The system of claim 12, further comprising:

a node deployment unit configured to:

identify at least one target software artifact from the plurality of software artifacts for one of the plurality of nodes based on the transmitted instruction; and determine a version of the at least one target software artifact for the node based on the transmitted instruction;

a fetching unit operatively coupled to the node deployment unit, configured to fetch the at least one target software artifact in the determined version from the software package repository to the node;

an installation unit operatively coupled to the fetching unit, configured to install the at least one target software artifact in the determined version on the node; and a record generator operatively coupled to the installation unit, configured to transmit the record for the node to the recording unit.

14. The system of claim 8, wherein each software artifact is stored in a version-controlled package format in the software package repository.

15. A machine-readable tangible and non-transitory medium having information recorded thereon for automatically deploying a distributed application stack on a cluster, wherein the information, when read by the machine, causes the machine to perform the following:

receiving a request to deploy the distributed application stack including a plurality of software artifacts on the cluster including a plurality of nodes;

retrieving configuration information from a configuration repository based on the received request, wherein the configuration information includes a version of each software artifact of the distributed application stack and a type of each node of the cluster, where the version is indicative of a state of development of a respective software artifact;

creating an instruction for each node based on the retrieved configuration information, wherein the instruction is to be used to direct each node to deploy at least one of the plurality of software artifacts from a software package repository onto the node itself; and transmitting the created instruction to each node.

16. The medium of claim 15, wherein the request comprises a version of the distributed application stack and a description of the cluster.

17. The medium of claim 16, wherein the step of retrieving comprises:

obtaining the type of each node from the configuration repository based on the received description of the cluster; and obtaining the version of each software artifact from the configuration repository based on the received version of the distributed application stack.

18. The medium of claim 15, wherein the step of creating comprises:

generating association information between at least one of the plurality of software artifacts and each type of the nodes;

generating version information of the at least one of the plurality of software artifacts for each type of the nodes; and providing the instruction based on the generated association information and version information.

19. The medium of claim 15, further comprising:

receiving a record from each node indicating a status during the deployment or a result after the deployment for the respective node; and storing the received record in a record repository.

20. The medium of claim 19, further comprising:

identifying at least one target software artifact from the plurality of software artifacts for one of the plurality of nodes based on the transmitted instruction;

determining a version of the at least one target software artifact for the node based on the transmitted instruction;

fetching the at least one target software artifact in the determined version from the software package repository to the node;

installing the at least one target software artifact in the determined version on the node; and transmitting the record for the node.

21. The medium of claim 15, wherein each software artifact is stored in a version-controlled package format in the software package repository.

22. A method, implemented on at least one machine having at least one processor, storage, and a communication platform connected to a network for automatically deploying a distributed application stack including a plurality of software artifacts on a cluster including a plurality of nodes, the method comprising the steps of:

receiving, by a node deployment unit via a communication platform, an instruction to be used to direct one of the plurality of nodes to deploy at least one of the plurality of software artifacts from a software package repository onto the node based on a version of each software artifact and a type of the node, wherein the version is indicative of a state of development of a respective software artifact;

identifying, by the node deployment unit, at least one target software artifact from the plurality of software artifacts for the node based on the received instruction;

determining, by the node deployment unit, a version of the at least one target software artifact for the node based on the received instruction;

fetching, by a fetching unit, the at least one target software artifact in the determined version from the software package repository to the node;

installing, by an installation unit, the at least one target software artifact in the determined version on the node; and transmitting, by a record generator via the communication platform, a record for the node indicating a status during the deployment or a result after the deployment.

23. A system having at least one processor, storage, and a communication platform connected to a network for automatically deploying a distributed application stack including a plurality of software artifacts on a cluster including a plurality of nodes, comprising:

a node deployment unit implemented on the at least one processor and configured to:

receive, via the communication platform, an instruction to be used to direct one of the plurality of nodes to deploy at least one of the plurality of software artifacts from a software package repository onto the node based on a version of each software artifact and a type of the node, wherein the version is indicative of a state of development of a respective software artifact;

identify at least one target software artifact from the plurality of software artifacts for the node based on the received instruction; and determining a version of the at least one target software artifact for the node based on the received instruction;

a fetching unit implemented on the at least one processor and configured to fetch the at least one target software artifact in the determined version from the software package repository to the node;

an installation unit implemented on the at least one processor and configured to install the at least one target software artifact in the determined version on the node; and a record generator operatively coupled to the installation unit, configured to transmit, via the communication platform, a record for the node indicating a status during the deployment or a result after the deployment.

24. A machine-readable tangible and non-transitory medium having information for automatically deploying a distributed application stack including a plurality of software artifacts on a cluster including a plurality of nodes recorded thereon, wherein the information, when read by the machine, causes the machine to perform the following:

receiving an instruction to be used to direct one of the plurality of nodes to deploy at least one of the plurality of software artifacts from a software package repository onto the node based on a version of each software artifact and a type of the node, wherein the version is indicative of a state of development of a respective software artifact;

identifying at least one target software artifact from the plurality of software artifacts for the node based on the received instruction;

determining a version of the at least one target software artifact for the node based on the received instruction;

fetching the at least one target software artifact in the determined version from the software package repository to the node;

installing the at least one target software artifact in the determined version on the node; and transmitting a record for the node indicating a status during the deployment or a result after the deployment.

25. The method of claim 1, wherein the version is represented by a number including a decimal point.

* * * * *